United States Patent [19]

Takahashi

[11] Patent Number: 5,239,571
[45] Date of Patent: Aug. 24, 1993

[54] RADIO TELEPHONE DEVICE CAPABLE OF AUTOMATICALLY RECONNECTING AN ABNORMALLY TERMINATED COMMUNICATION LINE

[75] Inventor: Shinya Takahashi, Hino, Japan

[73] Assignee: Kabushiki Kaisha Toshiba, Kawasaki, Japan

[21] Appl. No.: 774,195

[22] Filed: Oct. 10, 1991

[30] Foreign Application Priority Data

Oct. 11, 1990 [JP] Japan .................................. 2-272689

[51] Int. Cl.$^5$ .......................................... H04M 11/00
[52] U.S. Cl. ........................................ 379/58; 379/59
[58] Field of Search .................... 379/56, 58, 61, 59, 379/62; 455/127, 91

[56] References Cited

U.S. PATENT DOCUMENTS

| | | | |
|---|---|---|---|
| 4,727,568 | 2/1988 | Morishima | 379/58 |
| 4,912,774 | 3/1990 | Saito | 455/127 |
| 5,127,042 | 6/1992 | Gillig et al. | 379/58 |

Primary Examiner—Curtis Kuntz
Assistant Examiner—William D. Cumming

Attorney, Agent, or Firm—Finnegan, Henderson, Farabow, Garrett & Dunner

[57] ABSTRACT

A radio telephone device has the function of automatically reconnecting a telephonic communication line when the communication is terminated due to abnormality of the communication line during telephonic communication. If the communication is abnormally terminated due to abnormality of the telephonic communication line with a party during telephonic communication, the radio telephone device detects this fact and determines whether the communication was started by an outgoing call from the radio telephone device or by an incoming call from the party and stores the result of the determination. If the abnormally terminated communication was started by the outgoing call from the radio telephone device, the radio telephone device places an outgoing call to the party to automatically reconnect a telephonic communication line to the party. If the communication was started by an incoming call from the party, the radio telephone device automatically connects a telephonic communication line to the party without a user of the radio telephone device responding to an incoming call from the party.

14 Claims, 8 Drawing Sheets

RADIO TELEPHONE DEVICE CAPABLE OF AUTOMATICALLY RECONNECTING AN ABNORMALLY TERMINATED COMMUNICATION LINE

BACKGROUND OF THE INVENTION

1. Field of the Invention

The present invention relates to a radio telephone device applied to car telephone devices, and more particularly to a radio telephone device capable of automatically reconnecting a telephonic communication line when telephonic communication is terminated during communication due to an abnormality of the communication line.

2. Description of the Related Art

Generally and in a car telephone device, when the conditions in a communication line deteriorates during telephonic communication so that the telephonic communication cannot be maintained for a few seconds, the telephonic communication is automatically terminated both in the base station and the telephone device to thereby disconnect the communication line. For example, when a car passes through a tunnel, the inability to perform the telephonic communication may continue for a certain period of time. In that case, the telephonic communication is automatically terminated in both the base station and the telephone device in order to avoid the occupation of the communication line by unwanted electric waves to thereby improve the effective use of the communication line.

In such a situation, since the telephonic communication is suddenly terminated irrespective of the calling and called parties' intention, the intended conversation between both parties is usually not completed. Accordingly, it is a general practice that when the user was a calling party during the terminated communication, he will again dial to the party whereas when he was a called party, he will wait another incoming call from the party.

Making a call or responding to an incoming call while driving the car, however, is not preferred from a standpoint of traffic safety and sometimes causes a traffic accident.

SUMMARY OF THE INVENTION

The present invention has been made in order to solve the above-described problems. It is an object of the present invention to provide a radio telephone device capable of automatically placing an outgoing call again or responding to an incoming call without a need for any operation when telephonic communication is terminated due to deterioration of the condition in the communication line.

According to the present invention, a radio telephone device detects the situation that a telephonic communication with a party is terminated due to the abnormality of the communication line. The radio telephone device then determines whether the terminated telephonic communication was started by an outgoing call made by the telephone device or by an incoming call sent from the party and stores the result of the determination. If the result of the determination is that the terminated telephonic communication was started by the calling made by the telephone device, the telephone device automatically places an outgoing call to the party to reconnect the communication line with the party. If the result of the determination is that the terminated telephonic communication was started by the incoming call sent from the party, the telephone device automatically reconnects the communication line with the party upon receipt of an incoming call from the party without the user's responding operation to the incoming call.

Arrangement may be such that the automatic reconnection of the communication line with the party without the user's responding operation to the incoming call from the party is performed only when there is an incoming call from the party in a predetermined time after the termination of the communication.

Further, arrangement may be such that there is provided a reconnecting mode selected by a predetermined key operation. In this arrangement, the automatic reconnection of the communication line with the party by automatically calling the party and the automatic reconnection of the communication line with the party upon receipt of an incoming call from the party may be performed only when a reconnecting mode is selected by the key operation.

As described above, according to the inventive radio telephone device, when the terminated telephonic communication was initiated by an outgoing call made by the radio telephone device, the radio telephone device again places an outgoing call to the party while when the terminated telephone communication was initiated by an incoming call from the party, the radio telephone device automatically responds to an incoming call first received after the telephonic communication was terminated. Therefore, the communication line with the party can be reconnected without requiring any operations by the user.

DESCRIPTION OF THE PREFERRED EMBODIMENT

A preferred embodiment of the present invention will be described in detail with reference to the accompanying drawings.

Figure 1:
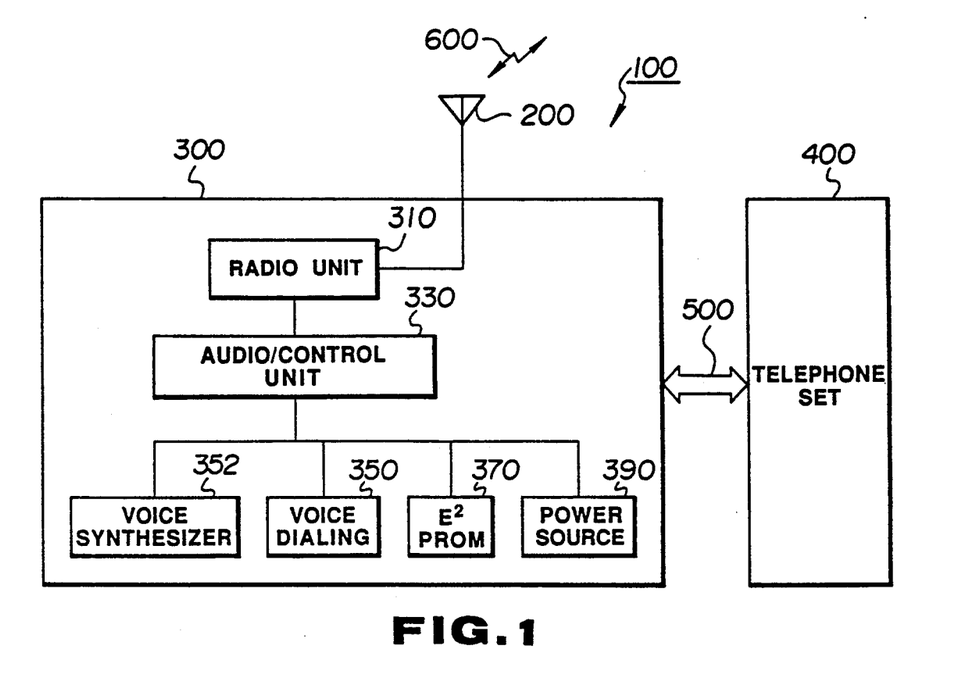
FIG. 1 is a block diagram illustrating a schematic structure of a car telephone device according to one embodiment of the present invention.

FIG. 1 is a block diagram illustrating the structure of a car telephone device according to one illustrative embodiment of the present invention.

The car telephone device 100 includes a radio device 300 and a telephone set 400. Radio device 300 has an antenna 200 connected thereto. The radio device 300 is connected through a signal cable 500 to the telephone set 400.

Antenna 200 is attached to an outer surface of a car (not shown) on which car telephone device 100 is mounted. Radio device 300 is accommodated, for example, in a trunk of the car. As will be described in more detail later referring to FIG. 4, telephone set 400 includes a body 400a and a handset 400b, which are mounted, for example, in the vicinity of the driver seat in the car.

Radio device 300 forms a radio circuit 600 through antenna 200 with a base station (not shown). Radio device 300 includes a radio unit 310 which transmits/receives signals through radio circuit 600 to/from the base station, audio/control unit 330 which synthetically controls the entire device, a voice dialing unit 350 which performs voice recognition and voice synthesizing, voice synthesizing unit 352 which performs voice synthesizing for making various kinds of reports, $E^2$ ROM 370 which records data on identification (ID number) on car telephone device 100 and the telephone number of telephone device, power source 390 which receives the power of a battery of the car on which the telephone device 100 is mounted and forms a required power source and supplies power to the respective elements concerned of the telephone device 100.

Figure 2:
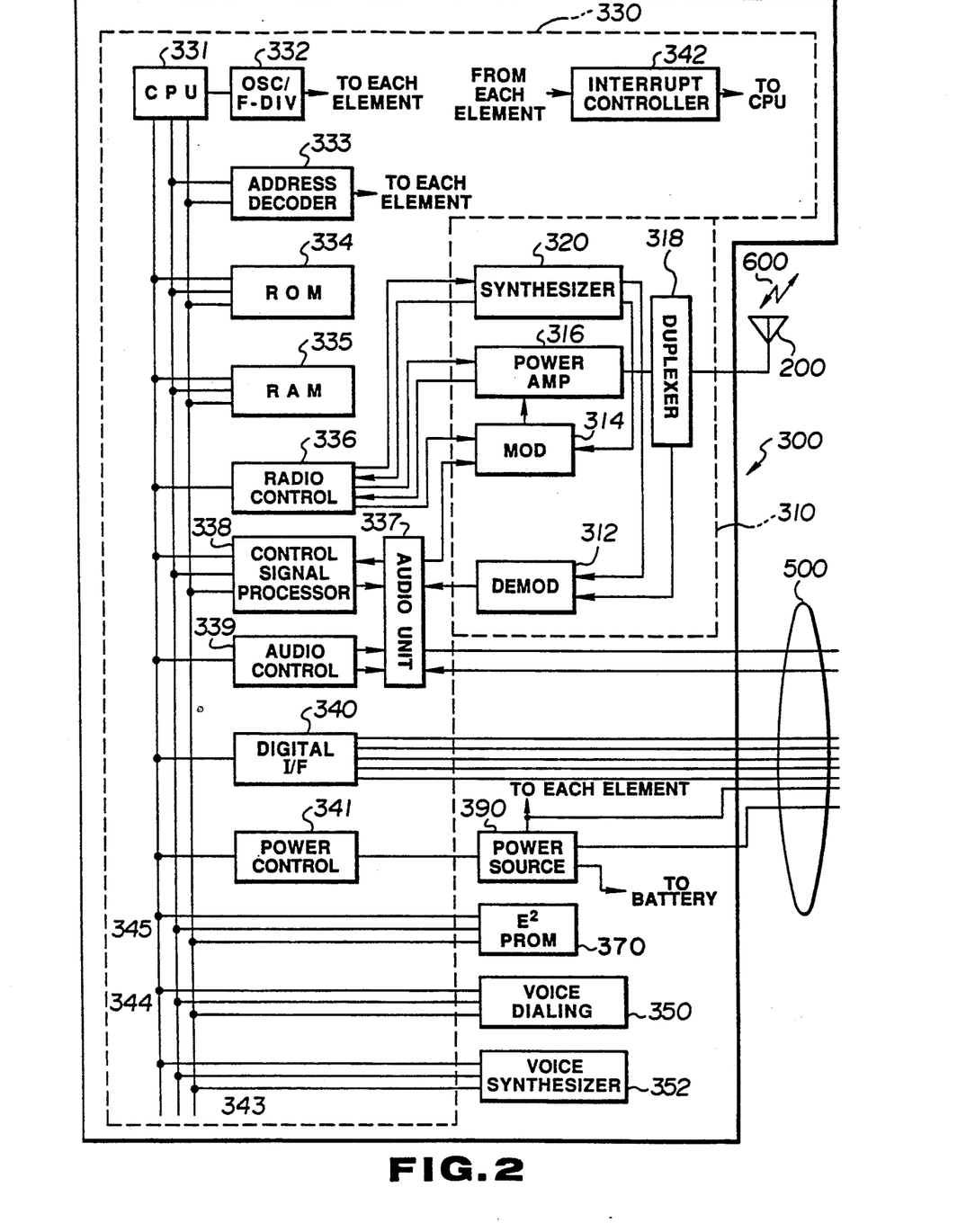
FIG. 2 is a block diagram illustrating the detailed structure of a radio device shown in FIG. 1.

FIG. 2 illustrates the detailed structure of radio device 300. In FIG. 2, radio unit 310 includes demodulator 312, modulator 314, power amplifier 316, duplexer 318 and synthesizer 320.

Demodulator 312 demodulates a signal received from the base station through radio circuit 600, antenna 200 and duplexer 318. The received signal includes an acoustic signal, control signals, etc.

Modulator 314 modulates an acoustic signal and control signals output from audio/control unit 330 to form a transmitted signal.

Power amplifier 316 amplifies a transmitted signal output from modulator 314.

Duplexer 318 delivers the signal received through radio circuit 600, antenna 200 to demodulator 312 and transmits a transmission signal received through modulator 314, power amplifier 316 to antenna 200.

Synthesizer 320 is a local oscillator for selection of a channel. It designates a frequency to be demodulated by demodulator 312 and a frequency to be modulated.

Audio/control unit 330 comprises a central processing unit (CPU) 331, oscillator/frequency divider 332, address decoder 333, read only memory (ROM) 334, random access memory (RAM) 335, radio unit controller 336, audio unit 337, control signal processor 338, audio unit controller 339, digital interface 340, power source control unit 341, and interrupt controller 342. The numeral 343 in the figure denotes, for example, 8-bit data bus; 344, an address bus; and 345, a control bus.

CPU 331 synthetically controls the entire audio/control unit 330.

Oscillator/frequency divider 332 delivers a clock to CPU 331 and divides the clock and delivers the resulting lowered frequencies as timing signals to the respective elements concerned of the device.

Address decoder 333 delivers required operating signals to the respective elements concerned in response to a command signal from CPU 331.

ROM 334 stores various programs required for the operation of CPU 331.

RAM 335 stores various data such as data required for the operation of CPU 331 and data formed by the operation of CPU 331.

Figure 3:
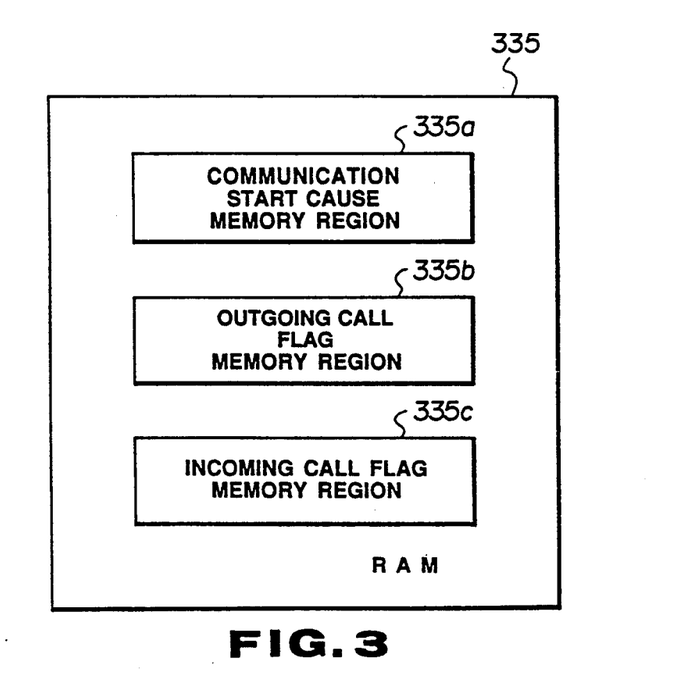
FIG. 3 illustrates an example of the structure of a storage region of a RAM in FIG. 2.

In this embodiment, as shown in FIG. 3, RAM 335 includes a telephonic communication start cause memory region 335a which stores a communication start cause indicative of whether the telephonic communication was started by an outgoing call from this device 100 or by an incoming call from a different party, outgoing call flag memory region 335b which stores an outgoing call flag indicating that the abnormally terminated telephonic communication was started by the call from this device 100, and incoming-call flag memory region 335c which stores an incoming call flag indicating that the telephonic communication was started by an incoming call from a different party. As will be obvious from a description made later, when abnormal termination of a telephonic communication occurs, the contents of telephonic communication start cause memory region 335a are referred to. If the abnormally terminated telephonic communication was started by an outgoing call from this device 100, the outgoing call flag indicative of this fact is stored in outgoing-call flag memory region 335b. If the abnormally terminated telephonic communication was started by an incoming call from a different party, an incoming call flag indicative of this fact is stored in incoming-call flag memory region 335c. Car telephone device 100 refers to the contents of memory regions 335b and 335c. If the abnormally terminated telephonic communication was started by the outgoing call from this device 100, this device again calls the different party and automatically reconnects the telephonic communication line to the party. If the abnormally terminated telephonic communication was started by the incoming call from the party, the telephone device 100 automatically connects the telephonic communication line to the party without responding to an incoming call from the party.

Radio unit controller 336 controls radio unit 310 in accordance with a command from CPU 331. For example, radio unit controller 336 designates a frequency which synthesizer 320 should designate, an amplification factor involving the amplification of power amplifier 316, a modulation factor involving the modulation of modulator 314, receives an out-of-synchronization signal, an output detection signal output from power amplifier 316 and delivers them to CPU 331 in order to prevent error operations.

Audio unit 337 delivers to control signal processor 338 a control signal of the received signals demodulated by demodulator 312; delivers an acoustic signal to voice dialing unit 350 and telephone set 400; delivers a control signal output from control signal processor 338 and acoustic signals output from telephone set 400 and voice dialing unit 350 to modulator 314; and delivers an acoustic signal output from voice synthesizer 352 to telephone set 400. Audio unit 337 also has the functions of filtering and shaping the control signals delivered to control signal processor 338 and of filtering the control signals delivered to modulator 314.

Control signal processor 338 is synchronized with a control signal output from audio unit 337 in units of a bit and a frame, extracts as a parallel signal control data from the base station and included in the control signal in the form of a serial signal and delivers to audio unit 337 control data as a parallel signal to be delivered to the base station as a control signal in the form of a serial signal.

Audio unit controller 339 controls audio unit 337 in various respects. For example, it provides switching control in which the received signal is delivered to any one of telephone sets 400 from audio unit 337 through control signal processor 338, voice dialing unit 350 or signal cable 500, and switching control in which any one of the transmitted signals output from telephone set 400 through control signal processor 338, voice dialing unit 350 or signal cable 500 to audio unit 337.

Digital interface 340 interfaces between radio unit 300 and telephone set 400 connected through signal cable 500 to radio unit 300.

Power source control unit 341 controls power source 390. For example, it sets the voltage fed from a battery (not shown) to power source 390 to a predetermined voltage and delivers it to the respective elements of telephone device 100.

Interrupt controller 342 receives interrupt instructions from respective elements concerned and interrupts CPU 331.

Figure 4:
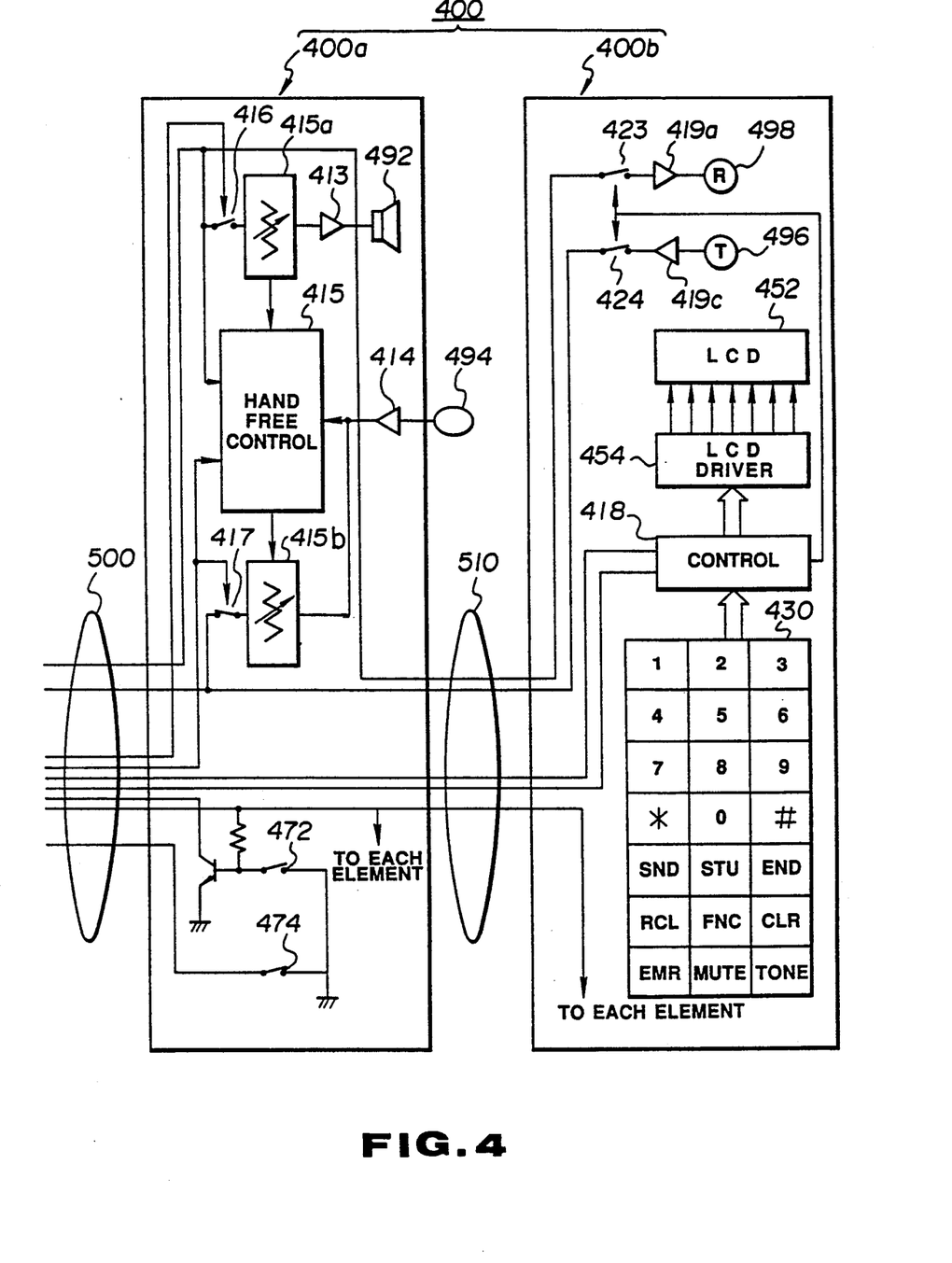
FIG. 4 is a block diagram illustrating the detailed structure of a telephone set in FIG. 1.

The detailed structure of telephone set 400 of the telephone device 100 is shown in FIG. 4.

In FIG. 4, telephone set 400 includes body 400a and handset 400b. Body 400a includes amplifiers 413, 414; hand-free circuit 415, attenuators 415a, 415b; switches 416, 417; hand-free microphone 494; speaker 492; hook switch 472; and power source switch 474.

Amplifier 413 receives a speech signal delivered through signal cable 500 from audio unit 337 of the radio device 300 shown in FIG. 2 and through switch 416, attenuators 415a and outputs the amplified signal from speaker 492.

Amplifier 414 amplifies the speech signal received from hand-free microphone 494 and delivered to audio unit 337 of FIG. 2 through attenuators 415b, switch 414 and signal cable 500.

Hand-free circuit 415 controls attenuators 415a, 415b to prevent hauling due to acoustic coupling of the speech signal (transmitted voice) received from hand-free microphone 494 and the speech signal (received voice) output from speaker 492.

Switch 416 determines whether the speech signal delivered through signal cable 500 from audio unit 337 should be output from speaker 492.

Switch 416 determines whether the speech signal from hand-free microphone 494 should be delivered to audio unit 337 of FIG. 2 through signal cable 500. The switching of those switches 416, 417 is performed by a control signal delivered through signal cable 500 from audio/control unit 330 of the radio device 300 of FIG. 2.

Hook switch 472 detects an on-hook or off-hook state of handset 400b. The detected signal is delivered through signal cable 500 to digital interface 340 of radio device 300 of FIG. 2.

Power source switch 474 switches on/off the entire power source for car telephone device 100. This switching signal is delivered through signal cable 500 to power source 390 of radio device 300 of FIG. 2.

Handset 400b includes control unit 418, amplifiers 419a, 419c; switches 423, 424; liquid crystal display (LCD) 452; LCD driver 454; key unit 430 including a plurality of keys; handset microphone 496 and handset receiver 498.

Control unit 418 provides synthetic control over the entire handset 400b in accordance with control signals delivered through signal cables 500, 510 from audio/control unit 330 of radio device 300 of FIG. 2, and delivers control signals, etc., keyed in by key unit 430 through signal cables 510, 500 to audio/control unit 330 of radio device 300 of FIG. 2.

Amplifier 419a amplifies the speech signal delivered through signal cables 500, 510 and switch 423 from audio unit 337 of FIG. 2 and outputs it through handset receiver 498.

Amplifier 419c amplifies the speech signal received through handset microphone 496 and delivers it to audio unit 337 of FIG. 2 through switch 424 and signal cables 510, 500. Switch 423 determines whether the speech signal from unit 337 should be output from handset receiver 498 while switch 424 determines whether the speech signal from microphone 496 should be delivered to audio unit 337. The switching of these switches 423, 424 is performed under control of control unit 418.

Liquid crystal display 452 includes a numerical display of a few figures and a display of respective functions.

LCD driver 454 drives liquid crystal display 452 under control of control unit 418 to perform predetermined display.

Key unit 430 includes numeral keys "0"-"9", and function keys "*", "#", "SND", "STO", "END", "RCL", "FNC", "CLR", "EMR", "MUTE", "TONE". If any one of the keys is depressed, this fact is recognized by control unit 418 and the result of the recognition is delivered through signal cables 510, 500 to digital interface 340 of audio/control unit 330 of FIG. 2.

Figure 5:
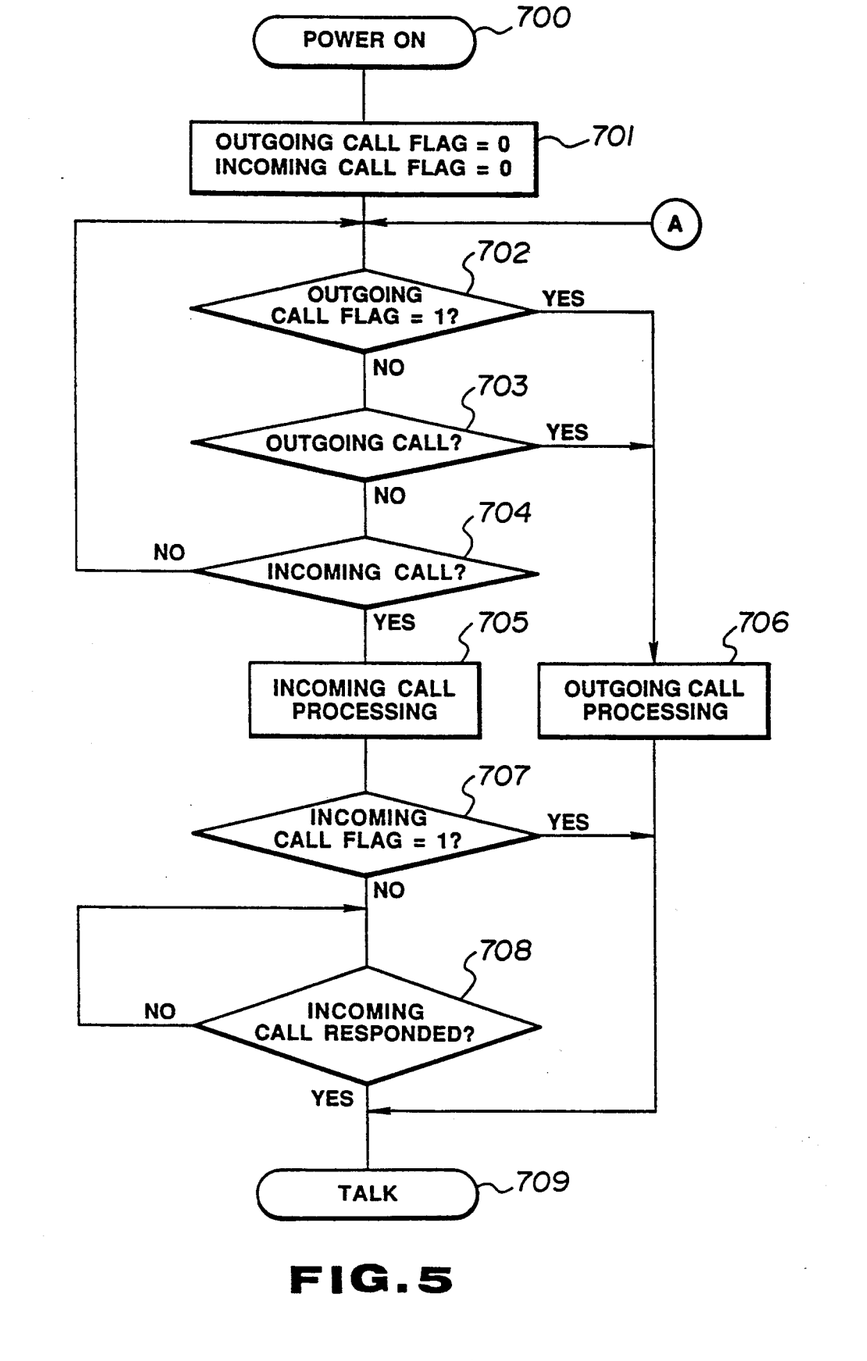
FIGS. 5 and 6 are flowcharts illustrating the operation of the embodiment of FIG. 1.
Figure 6:
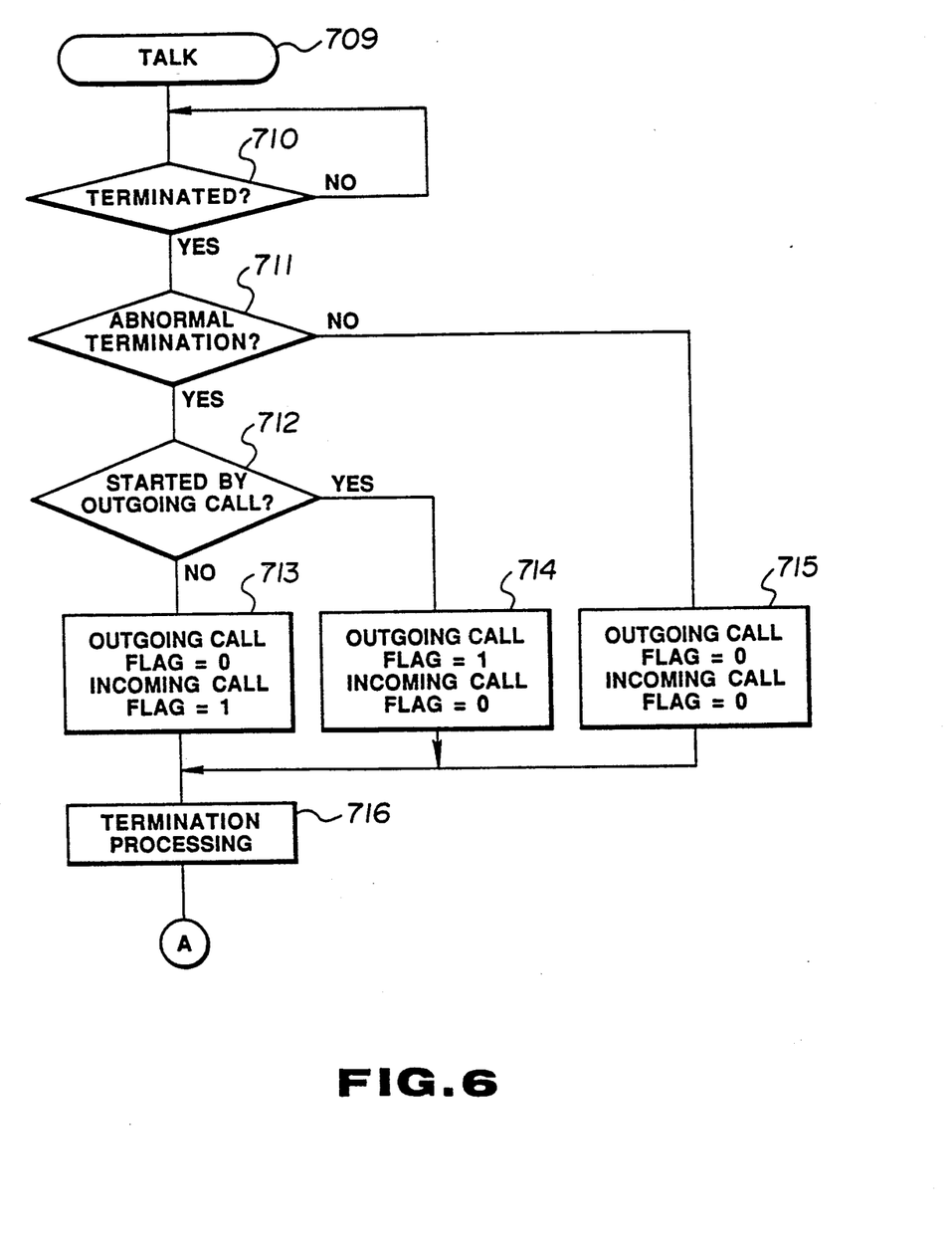

The operation of car telephone device 100 of this embodiment will be described in detail hereinafter with the flowcharts of FIGS. 5 and 6, which show a series of operations involving a telephonic communication, wherein FIG. 5 involves the operations from the turning on of the power source to the start of a telephonic communication while FIG. 6 shows the operation from a telephonic communication to the termination of the communication.

In FIGS. 5 and 6, first, when power source switch 474 of FIG. 4 is switched on (step 700) both the outgoing call flag stored in outgoing-call flag memory region 335b of RAM 335 shown in FIG. 3 and the incoming call flag stored in incoming call flag memory region 336c are reset to "0" (step 701).

Then it is checked whether the outgoing call flag stored in outgoing-call flag memory region 335b of RAM 335 is "1" (step 702). Since the outgoing call flag =0 here, it is checked whether the call is an outgoing one (step 703). Whether the call is an outgoing call or not is checked by recognition of the output of hook switch 472 of telephone body 400a by the CPU of audio/control unit 330 through signal cable 500, digital interface 340 of audio/control unit 330 of FIG. 2 when the outgoing call is due to handset 400b going off hook; by recognition, by CPU of audio/control unit 330, of whether outgoing call key "SND" of key unit 430 of handset 400b shown in FIG. 4 is depressed through control unit 418 of handset 400b, signal cables 510, 500, and digital interface 340 of FIG. 2 when the call has occurred by depression of the outgoing call key "SND" of key unit 430; and by recognition of the output of voice dialing unit 350 by the CPU of audio/control unit 330 when the outgoing call is due to voice dialing unit 350.

If the call is an outgoing one, a series of predetermined outgoing call processes including delivery of a dial signal by operating key unit 430 of handset 400b, delivery of a dialing signal by voice dialing unit 350, or establishment of radio circuit 600 between radio device 310 and the base station (not shown) under control of radio device 310 is performed (step 706) and a telephonic communication channel is established between telephone set 400 and the caller through radio device 300 (step 709). At this time, when the telephonic communication has occurred by the outgoing call from telephone device 100, this fact is stored in telephonic communication start cause memory region 335a of RAM 335 of FIG. 3. The called party's telephone number involving this call is stored in telephonic communication start cause memory region 335a of RAM 335 of FIG. 3.

Since the details of this outgoing calling operation does not directly relate to the invention, further description thereof will be omitted.

At step 703 when the call is determined not to be an outgoing one, then it is checked whether the call is an incoming one from a party (step 704). Whether the call is an incoming one or not is determined by the recognition of the control signal, which radio unit 310 of radio device 300 has received through radio circuit 600 and antenna 200, by the CPU of audio/control unit 330 through audio unit 337, control signal processor 338.

At step 704 when the call is determined to be an incoming one, a predetermined incoming call processing operation is performed (step 705).

More particularly, a series of incoming call processing operations is performed which includes the generation of a ringing tone from speaker 492 of telephone body 400a responding to the incoming call. Since the details of the incoming call processing operation are not directly related to the present invention, a further description thereof will be omitted. At step 704 when the call is not an incoming one, control passes to step 702 and the above operations are iterated.

If the incoming call processing operations are performed, it is checked whether the incoming call flag is "1". Since the incoming call flag=0 here in this case, standby continues until a response to an incoming call due to handset 400b going off hook starts (step 708). In this case, a telephonic communication channel is established between the telephone device 100 and the caller through radio device 300, so that telephonic communication with the caller starts (step 709). If the telephonic communication starts by an incoming call from the caller at this time, this fact is stored in telephonic communication start cause memory region 335a of RAM 335 of FIG. 3.

When a telephonic communication starts (step 709), it is checked whether the communication is terminated. The termination of the telephonic communication occurs by the depression of termination key "END" of handset key 430, due to handset 400b going on hook, by a user's intentional operation such as termination due to the called party's handset going on hook, and due to abnormal termination caused by the state of the communication channel irrespective of the user's intention. The abnormal termination caused by the state of the telephonic communication channel is performed in the present embodiment as follows: this embodiment is arranged such that a predetermined monitor tone (SAT) added to a speech signal is transmitted from the base station in the communication state. Radio unit 300 of telephone device 100 invariably monitors the monitor tone. If no monitor tone is detected for a predetermined time, for example, of five seconds, radio unit 300 determines that the telephonic communication is difficult to maintain due to phasing to thereby terminate the telephonic communication automatically. In this case, the user cannot predict this abnormal termination.

At step 710 when the termination of the communication is determined, it is then checked whether the termination is due to an abnormal one caused by the state of the communication channel (step 711).

If so, data stored in telephonic communication start cause memory region 335a of RAM 335 shown in FIG. 3 is checked to determine whether the communication start cause is an outgoing call (step 712). If so, the outgoing call flag=1 and the incoming call flag=0 are set (step 714). That is, "1" is written into RAM 335 outgoing call flag memory region 335b shown in FIG. 3 and "0" is written into incoming call flag memory region 335c.

At step 712 when it is determined that the communication start cause is not an outgoing call, it is determined that the communication start cause is an incoming call and the outgoing flag=0 and incoming call flag=1 are set (step 713). That is, "0" is written into RAM outgoing-flag memory region 335b and "1" written into incoming-call flag memory region 335c in FIG. 3.

At step 711 when it is determined that the termination is not an abnormal one, it is determined that the termination is a normal one by the user's intention and the outgoing flag=0 and the incoming call flag=0 are set (step 715). That is, "0" is written into both RAM outgoing-flag memory region 335b and incoming-call flag memory region 335c shown in FIG. 3.

Thereafter, a predetermined termination process is performed (step 716). After this, control returns to step 702 where it is checked whether the output going flag is "1". Under such condition, the outgoing flag varies depending on the manner of the last termination. That is, in the case of a normal termination in the flowchart of FIG. 6, the outgoing flag=0 and the incoming call flag=0 are set, so that the outgoing flag is "0". If the communication start cause is an incoming call although abnormal termination occurred, the outgoing flag=0 and the incoming call flag=1 are set, so that the outgoing flag is "0". However, when an abnormal termination occurs and the communication start cause is an outgoing call, the outgoing flag=1 and the incoming call flag=0 are set. In this case, the outgoing flag is "1".

Therefore, when an abnormal termination occurs and the communication start cause is an outgoing call, the conditions of determination at step 702 hold and control passes to step 706 where the outgoing call operation is performed without any special operations by user. In this case, the called party's telephone number used in this outgoing call operation is the one stored in RAM 335 in the last outgoing call operation.

At step 702 it is determined that the outgoing flag is not "1", control passes to step 703. The operation in this case is as described above.

At step 705 when the incoming call operation ends, it is checked whether the incoming call flag is "1". If abnormal termination occurred in the last communication and the communication start cause of this communication is an incoming call, the outgoing flag=0 and the incoming call flag=1 are set at step 713 of FIG. 6, so that the outgoing flag becomes "1". In this case, control passes to step 709 without determining the incoming call response (step 708) and the telephonic communication starts also without requiring any special operations by the user in this case.

As described above, when the communication is abnormally terminated due to abnormality of the circuit state, either the outgoing flag or the incoming call flag is set in accordance with the conditions of start of the communication, so that an outgoing call is again placed or a telephonic communication state starts without confirming a response to an incoming call depending on the conditions of the termination and the conditions of start of the last communication. Therefore, the user is able to place an outgoing call and to respond to an incoming call without performing any operations. If a car telephone device has a hand-free function and a speech calling function, the user does not require any operations for starting a telephonic communication.

A timer may be provided which indicates the time passing after the termination of a telephonic communication such that transfer to telephonic communication is achieved without requiring any responding operation to only an incoming call arriving in a predetermined time after the termination of the telephonic communication.

Figure 7:
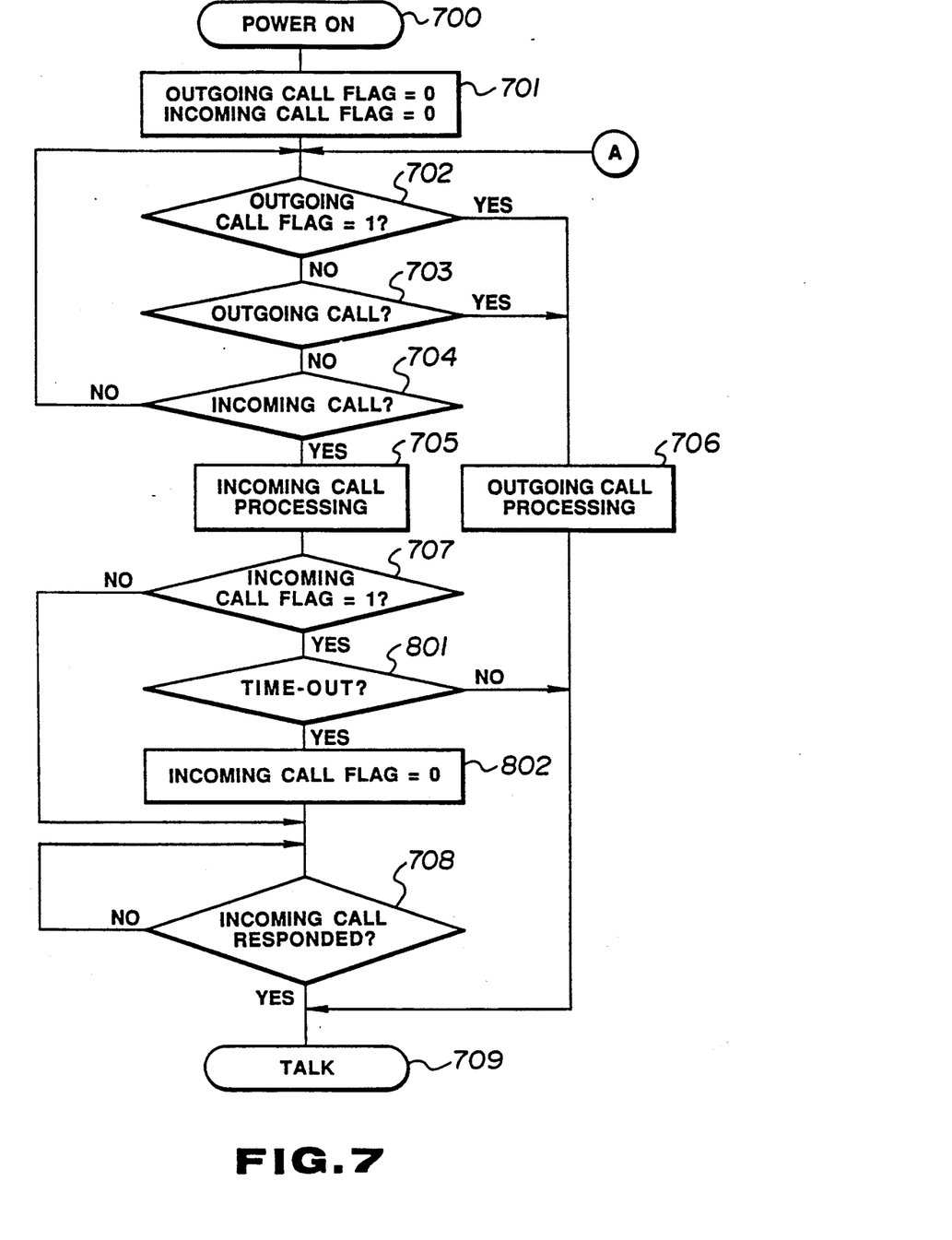
FIGS. 7 and 8 are flowcharts illustrating another operation of the embodiment of FIG. 1.

FIGS. 6 and 7 show another illustrative operation of the embodiment thus constructed.

Figure 8:
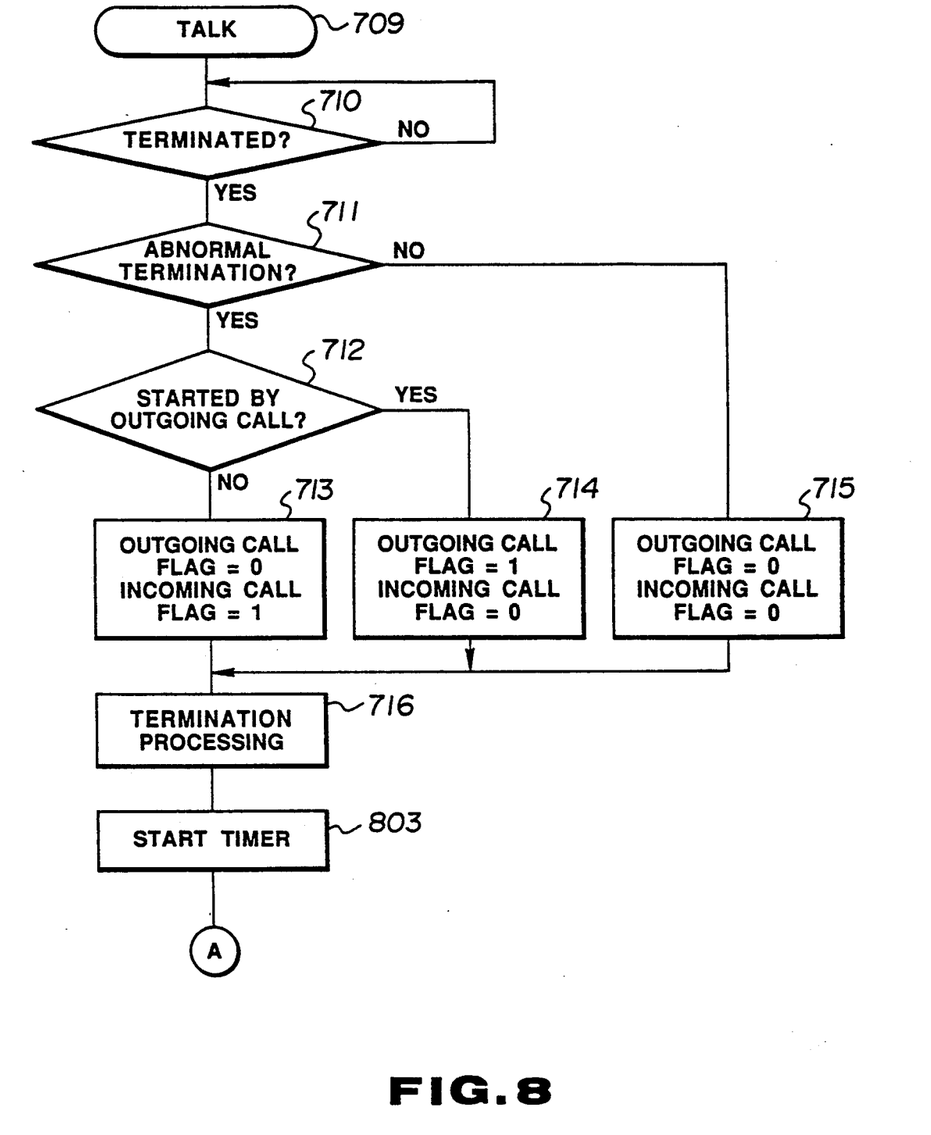

The flowchart of FIG. 7 includes addition of new steps 801 and 802 between steps 707 and 708 of the FIG. 5 flowchart, and the flowchart of FIG. 8 includes addition of step 803 after step 716 of the FIG. 6 flowchart.

When termination of the communication is completed at step 803 of FIG. 8, a timer which counts a predetermined time starts (step 803). The timer may be arranged such that numerical values stored in a predetermined memory region of RAM 335 is incremented by a predetermined clock.

At step 707 of FIG. 7, when it is determined that the incoming call flag is "1", it is then checked whether the timer has come to time-out (step 801). If not, control passes to communication without confirming a response to an incoming call (step 709). If the timer has come to time-out, control passes to a telephonic communication (step 709) after a response to an incoming call is placed (step 708) like an ordinary operation.

Placing an outgoing call automatically in abnormal termination or transfer to telephonic communication without responding to an incoming call may be either inhibited or permitted by a predetermined operation of key unit 430.

Figure 9:
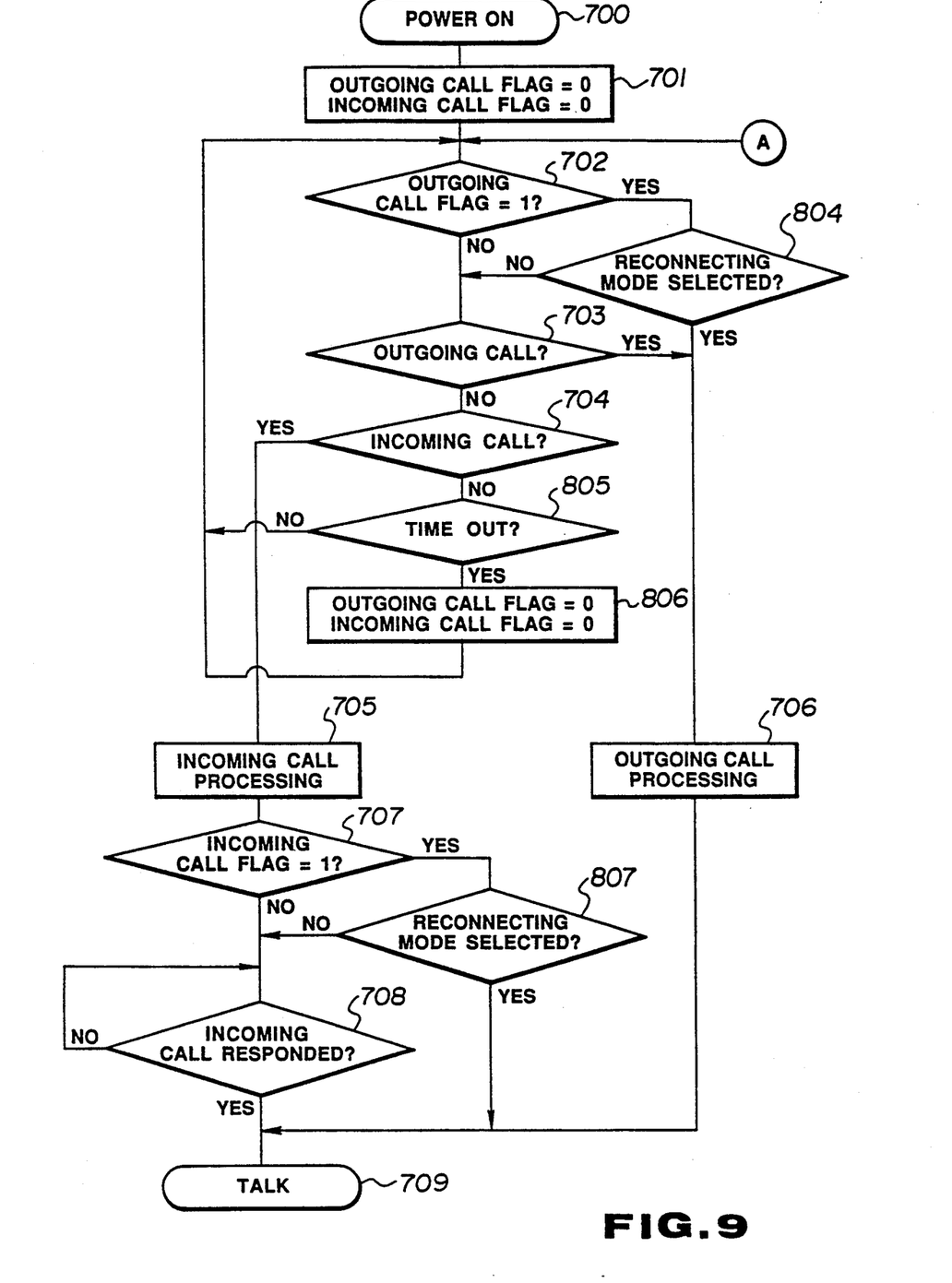
FIG. 9, which is to be combined with the flowchart of FIG. 8, is a flowchart illustrating a further operation of the embodiment of FIG. 1.

FIG. 9 shows another illustrative operation of the embodiment thus constructed. The flowchart of FIG. 9 corresponds to that of FIG. 7. In this case, the operations from a telephonic communication to its termination may be similar to the FIG. 8 flowchart.

In this illustrative operation, it is arranged that only when the "reconnecting mode" is selected by a predetermined operation of key unit 430, placing an outgoing call automatically again in abnormal termination and transfer to telephonic communication without responding to an incoming call are permitted.

First, in this illustrative operation, when a process for terminating the communication ends at step 803 as in the FIG. 8 flowchart, a timer which counts a predetermined time starts (step 803). If the outgoing flag is determined as "1" at step 702 of FIG. 9, it is then checked whether the reconnecting mode is selected (step 804). If so, control passes to a process for placing an outgoing call (step 706). If no reconnecting mode is selected, control passes to step 703 where ordinary processing starts which involves determining whether the call is an outgoing one.

At step 704 it is determined whether the call is an incoming one. If not, it is checked whether the timer which started at step 803 has come to time-out (step 801). If not, control returns to step 702. If the timer has come to time-out, the outgoing call flag and the incoming call flag are cleared to 0 (step 806) and control then returns to step 702. The reason for provision of steps 805, 806 is that when the reconnecting mode is not selected, the outgoing and incoming call flags cannot be cleared in such arrangement.

If the incoming call processing operation ends at step 705 and the incoming call flag at this time is "1" (step 707), it is determined whether the reconnecting mode is selected (step 807). If so, control passes to a telephonic communication (step 709). If no reconnecting mode is selected, control passes to step 708 for normal processing in which the incoming call response is confirmed.

While the present embodiment is disclosed as being applied to the car telephone device, the present invention may be applicable to other radio telephone devices such as, for example, portable telephone devices and cordless telephone devices.

What is claimed is:

1. A radio telephone device adapted to be connected to a party through a telephonic communication line including a radio circuit, comprising:
    means for detecting abnormal termination of a telephonic communication with the party during telephonic communication due to abnormality of the telephonic communication line;
    means for determining whether the telephonic communication was started by an outgoing call placed by the radio telephone device or by an incoming call from the party when the abnormal termination is detected by the detecting means;
    means for storing the fact that the telephonic communication was started by the outgoing call from the radio telephone device when the detecting means determines so; and
    reconnecting means for making a call to the party to reconnect the telephonic communication line to the party if the aforementioned fact is stored in the storing means.

2. A radio telephone device according to claim 1, wherein the detecting means detects the abnormal termination when a monitor tone transmitted through the radio circuit during the telephonic communication ceases for a predetermined period of time.

3. A radio telephone device according to claim 1, wherein the determining means comprises:
    means for storing a telephonic communication start cause indicative of whether the communication was started by an outgoing call placed by the radio telephone device or by an incoming call from the party; and wherein
    the determining means determines whether the communication was started by the outgoing call placed by the radio telephone device or an incoming call from the party by referring to the telephonic communication start cause stored in the telephonic communication start cause storing means when the communication is terminated.

4. A radio telephone device according to claim 1, wherein the storing means comprises a memory region for storing an outgoing call flag indicating that the communication was started by an outgoing call placed by the radio telephone device,
    whereby the memory region stores the fact that the communication was started by an outgoing call placed by the radio telephone device by means of setting the flag.

5. A radio telephone set according to claim 4, wherein the reconnecting means makes a call to the party when the flag is set in the memory region.

6. A radio telephone device according to claim 1, further comprising:
   means for selecting a reconnecting mode; and
   means for making the reconnecting means operable under the conditions where the reconnecting mode is selected by the selecting means.

7. A radio telephone device adapted to be connected to a party through a telephonic communication line including a radio circuit, comprising:
   means for detecting abnormal termination of a telephonic communication with the party during telephonic communication due to abnormality of the telephonic communication line;
   means for determining whether the telephonic communication was started by an outgoing call placed by the radio telephone device or by an incoming call from the party when the abnormal termination is detected by the detecting means;
   means for storing a fact determined by the determining means;
   reconnecting means for reconnecting the telephonic communication line to the party by placing an outgoing call to the party when the fact that the abnormally terminated communication was started by placing an outgoing call from the radio telephone device is stored in the storing means; and
   non-responding connection means for automatically reconnecting a telephonic communication line to the party without a user of the radio telephone device responding to an incoming call from the party when the fact that the abnormally terminated communication was started by an incoming call from the party is stored in the storing means.

8. A radio telephone set according to claim 7, wherein the storing means comprises:
   a first memory region for storing a first flag indicating that the communication was started by an outgoing call placed by the radio telephone device;
   a second memory region for storing a second flag indicating that the communication was started by an incoming call from the party;
   whereby the storing means stores whether the communication was started by an outgoing call from the radio telephone device or by an incoming call from the party depending on whether a first flag or second flag is set in the first or second storage region, respectively.

9. A radio telephone device according to claim 8, wherein the reconnecting means starts its operation to automatically reconnect a telephonic communication line to the party by making a call to the party under the conditions where the first flag is set in the first memory region; and
   the non-responding connection means automatically reconnects a telephonic communication line to the party without a user of the radio telephone device responding to an incoming call from the party under the conditions where the second flag is set in the second memory region.

10. A radio telephone device according to claim 7, further comprising:
    means for starting to measure a time in response to the termination of the telephonic communication and stopping the measurement when a predetermined time is elapsed; and
    means for inhibiting the operation of the non-responding connection means after the starting means stops its measurement.

11. A radio telephone device according to claim 7, further comprising:
    means for selecting a reconnecting mode; and
    means for making the reconnecting means and the non-responding connection means under the conditions where the reconnecting mode is selected by the selecting means.

12. A radio telephone device according to claim 7, further comprising:
    timer means for starting to measure a time in response to the termination of the telephonic communication and stopping the measurement when a predetermined time is elapsed; and
    means for erasing the storage in the storing means when the timer means stops its measurement operation.

13. A radio telephone device adapted to be connected to a party through a telephonic communication line including a radio circuit, comprising:
    means for detecting abnormal termination of a telephonic communication with the party during telephonic communication due to abnormality of the telephonic communication line;
    means for determining whether the telephonic communication was started by an outgoing call placed by the radio telephone device or by an incoming call from the party when the abnormal termination is detected by the detecting means;
    means for storing the fact that the telephonic communication was started by an incoming call from the party when the detecting means determines so; and
    non-responding connection means for automatically connecting the telephonic communication line to the party without a user of the radio telephone device responding to an incoming call from the party when the aforementioned fact is stored in the storing means.

14. A radio telephone device according to claim 13, further comprising means for starting to measure a time in response to the termination of the telephonic communication and stopping the measurement when a predetermined time is elapsed; and
    means for inhibiting the operation of the non-responding connection means after the starting means stops its measurement.

* * * * *